United States Patent
Zhang et al.

(10) Patent No.: US 10,756,853 B2
(45) Date of Patent: Aug. 25, 2020

(54) METHOD AND DEVICE FOR INCREMENTAL REDUNDANCY HYBRID AUTOMATIC REPEAT REQUEST (IR-HARQ) RE-TRANSMISSION

(71) Applicant: Huawei Technologies Co., Ltd., Shenzhen (CN)

(72) Inventors: Gongzheng Zhang, Hangzhou (CN); Huazi Zhang, Hangzhou (CN); Rong Li, Hangzhou (CN); Jun Wang, Hangzhou (CN); Yiqun Ge, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 116 days.

(21) Appl. No.: 15/784,836

(22) Filed: Oct. 16, 2017

(65) Prior Publication Data

US 2018/0115393 A1 Apr. 26, 2018

Related U.S. Application Data

(60) Provisional application No. 62/411,485, filed on Oct. 21, 2016.

(51) Int. Cl.
*H04L 1/00* (2006.01)
*H04L 1/18* (2006.01)
*H04B 1/02* (2006.01)

(52) U.S. Cl.
CPC .......... *H04L 1/1819* (2013.01); *H04L 1/0041* (2013.01); *H04L 1/0057* (2013.01);
(Continued)

(58) Field of Classification Search
None
See application file for complete search history.

(56) References Cited

U.S. PATENT DOCUMENTS

2012/0204075 A1 8/2012 Kang et al.
2013/0262952 A1 10/2013 Hahm et al.
(Continued)

FOREIGN PATENT DOCUMENTS

CN 101414898 A 4/2009
CN 101621365 A 1/2010
(Continued)

OTHER PUBLICATIONS

E. Hof, I. Sason, S. Shamai and C. Tian, "Capacity-Achieving Polar Codes for Arbitrarily Permuted Parallel Channels," in IEEE Transactions on Information Theory, vol. 59, No. 3, pp. 1505-1516, Mar. 2013. (Year: 2013).*

(Continued)

*Primary Examiner* — Daniel F. McMahon
(74) *Attorney, Agent, or Firm* — Slater Matsil, LLP (57) ABSTRACT

Aspects of this disclosure provide a technique for implementing polar encoding with incremental redundancy HARQ re-transmission. In particular, a transmitter encodes a message using different polar codes to obtain a first codeword and a second codeword that is twice the length of the first codeword, and transmit the first codeword as an original transmission, and the second half of the second codeword as a re-transmission without transmitting the first half of the second codeword. Information bits that are common to both the first codeword and the second half of the second codeword is mapped to more-reliable bit-locations in the second half of the second codeword. Decoded bit values for the common information in the original transmission and retransmission is compared by the receiver to perform a parity check.

15 Claims, 7 Drawing Sheets

(52) U.S. Cl.
CPC .......... *H04L 1/0061* (2013.01); *H04L 1/1816*
(2013.01); *H04B 1/02* (2013.01)

(56) References Cited

U.S. PATENT DOCUMENTS

| | | | | |
|---|---|---|---|---|
| 2014/0331083 | A1* | 11/2014 | Aliev | G06F 11/108 714/6.23 |
| 2015/0194987 | A1* | 7/2015 | Li | H04L 1/0057 714/752 |
| 2015/0358113 | A1* | 12/2015 | Callard | H04W 28/04 714/776 |
| 2016/0088635 | A1 | 3/2016 | Davydov et al. | |
| 2016/0285479 | A1 | 9/2016 | El-Khamy et al. | |
| 2017/0012744 | A1* | 1/2017 | Shen | H04L 1/0041 |
| 2017/0222757 | A1* | 8/2017 | Huang | H04L 1/0058 |

FOREIGN PATENT DOCUMENTS

| | | |
|---|---|---|
| CN | 102474399 A | 5/2012 |
| CN | 103368687 A | 10/2013 |
| CN | 105553877 A | 5/2016 |
| CN | 105743621 A | 7/2016 |
| CN | 106027068 A | 10/2016 |
| WO | 2015139316 A1 | 9/2015 |

OTHER PUBLICATIONS

El-Khamy, Mostafa et al., "HARQ Rate-Compatible Polar Codes for Wireless Channels," IEEE, Modem Systems R&D, Samsung Electronics, 2015, 6 pages.

Alsan, Mine, "Channel Polarization and Polar Codes," Technical Report, Information Theory Laboratory, School of Computer and Communication Sciences, Feb. 2012, 58 pages.

Hong, S. et al., "Capacity-Achieving Rate-Compatible Polar Codes", arXiv:1510.01776v2 [cs.IT], XP55463444A, 12 Pages, Jan. 27, 2016.

Huawei et al., "HARQ scheme for polar codes", 3GPP TSG RAN WG1 Meeting #87, R1-1611255, Nov. 14-18, 2016, 26 Pages, Reno, USA.

Saber, H., "An Incremental Redundancy Hybrid ARQ Scheme via Puncturing and Extending of Polar Codes", IEEE Transactions on Communications, XP11589911A, Nov. 2015, 10 Pages, vol. 63, No. 11.

Tavildar, S., "A H-ARQ scheme for polar codes", arXiv: 1606.08545v1 [cs.IT], XP80711291A, 6 Pages, Jun. 28, 2016.

Nokia et al., "Discussion on the IR-HARQ support of polar codes", 3GPP TSG-RAN WG1 #86bis, R1-1609586, Oct. 10-14, 2016, 3 Pages, Lisbon, Portugal.

* cited by examiner

METHOD AND DEVICE FOR INCREMENTAL REDUNDANCY HYBRID AUTOMATIC REPEAT REQUEST (IR-HARQ) RE-TRANSMISSION

This patent application claims priority to U.S. Provisional Application No. 62/411,485 filed on Oct. 21, 2016 and entitled "Method and Device for Incremental Redundancy Hybrid Automatic Repeat Request (IR-HARQ) Re-Transmission," which is hereby incorporated by reference herein as if reproduced in its entirety.

TECHNICAL FIELD

The present disclosure relates generally to a method and device for coding, and, in particular embodiments, to a method and device for incremental redundancy hybrid automatic repeat request (IR-HARQ) re-transmission.

BACKGROUND

Polar codes are linear block error correcting codes that exploit channel polarization to improve overall transmission capacity. In particular, polar codes are designed to transmit information bits over more-reliable bit-channels (e.g., less noisy channels), while transmitting fixed (or frozen) bits over less-reliable bit-channels (e.g., noisier bit-channels). Polar encoding is described in greater detail by the academic paper entitled "Channel Polarization and Polar codes," which is incorporated herein by reference as if reproduced in its entirety.

SUMMARY

Technical advantages are generally achieved, by embodiments of this disclosure which describe systems and methods for Incremental Redundancy Hybrid Automatic Repeat Request (IR-HARQ) Re-Transmission.

In accordance with an embodiment, a method for polar encoding is provided. In this embodiment, the method comprises receiving a message comprising information bits, encoding the message using a first polar code to obtain a first codeword, encoding the message using a second polar code to obtain a second codeword that is twice the length of the first codeword, transmitting the first codeword to a receiver, and transmitting the second half of the second codeword to the receiver without transmitting the first half of the second codeword to the receiver when the receiver is unable to decode the message based on the first codeword. In one example, the first codeword includes one or more information bits that are included in the second half of the second codeword and excluded from the first half of the first codeword. Optionally, in such an example, or in another example, the second half of the second codeword excludes parity information for the one or more information bits that are common to both the first codeword and the second half of the second codeword. Optionally, in any one of the above mentioned examples, or in another example, one or more information bits that are common to both the first codeword and the second half of the second codeword are mapped to the most-reliable bit-locations in the second half of the second codeword. Optionally, in any one of the above mentioned examples, or in another example, the first codeword is transmitted as an original transmission, the second half of the second codeword is transmitted as a re-transmission, and wherein the one or more information bits are carried in more reliable bit-locations during the re-transmission than during the original transmission. Optionally, in any one of the above mentioned examples, or in another example, the method further includes encoding the message using a third polar code to obtain a third codeword, the third codeword being three times the length of the first codeword, and transmitting the last third of the third codeword without transmitting the first two thirds of the third codeword when the receiver is unable to decode the message based on the first codeword and the second half of the second codeword. An apparatus for performing this method is also provided.

In accordance with another embodiment, a method for polar decoding is provided. In this embodiment, the method includes receiving a first codeword carrying a set of information bits corresponding to a message, receiving a second half of a second codeword without receiving a first half of the second codeword, and decoding the message by processing at least the first codeword according to a first polar code and the second half of the second codeword according to a second polar code. The second half of the second codeword carries one or more information bits in the set of information bits corresponding to the message. At least some information bits in the set of information bits are excluded from the second half of the second codeword. In one example, decoding the message includes combining the second half of the second codeword with the first codeword to obtain a combined codeword, and decoding the combined codeword based on information bits and parity information in the combined codeword. Optionally, in such an example, or in another example, decoding the message includes decoding the second half of the second codeword to obtain values for the one or more information bits carried by the second half of the second codeword, and performing a parity check by comparing the values of the one or more information bits obtained from the second half of the second codeword with parity bits in the first codeword. Optionally, in any one of the above mentioned examples, or in another example, the first codeword is an original transmission, wherein the second half of the second codeword is a re-transmission of the original transmission, and wherein the one or more information bits are carried in more reliable bit-locations during the re-transmission than during the original transmission. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. The following references are related to subject matter of the present application. Each of the following applications are incorporated by reference herein as if reproduced in their entireties: Non-Provisional patent application Ser. No. 15/717,745 claiming priority to provisional Application Ser. No. 62/402,862 filed Sep. 30, 2016 and entitled "Method and Device for Parallel Polar Code Encoding/Decoding"; Non-Provisional patent application Ser. No. 15/699,976 and Non-Provisional patent application Ser. No. 15/699,967 claiming priority to Provisional Application Ser. No. 62/396,618 filed Sep. 19, 2016 and entitled "Method and Device for Assigning Dynamic Frozen Bits and Constructing a Parity Function on Them in a Polar Code;" and Provisional Application Ser. No. 62/395,272 filed Sep. 15, 2016 and entitled "An Encoding Method for Parity Check Concatenated Polar Codes".

Hybrid Automatic Repeat Request (HARQ) re-transmission techniques provide error control functionality for forward error-correction (FEC) encoding schemes. More specifically, FEC encoding schemes may transmit redundant information (e.g., FEC bits) along with information bits to increase the likelihood that a transmission will be successfully decoded. If the receiver is unable to decode a message after receiving an original transmission, then subsequent re-transmissions are performed until the message is successfully decoded or the maximum re-transmission number is reached. Chase-combing is a HARQ re-transmission technique in which the same data (e.g., the same combination of information and parity bits) is re-transmitted until the underlying message is decoded. Incremental redundancy is another HARQ re-transmission technique in which different data (e.g., different combinations of information and parity bits) are re-transmitted until the message is successfully decoded. In general, incremental redundancy provides better coding gain than chase-combining when implemented as a HARQ re-transmission technique.

Aspects of this disclosure provide a technique for implementing polar encoding with incremental redundancy HARQ re-transmission. In particular, a transmitter may encode a message using different polar codes to obtain multiple codewords. The first codeword is transmitted in an original transmission. If the message cannot be decoded based on the original transmission, then a second half of a second codeword is transmitted as part of a re-transmission without transmitting the first half of the second codeword.

In general, one or more information bits may be common to both the first codeword and the second half of the second codeword such that those information bits are present in both the original transmission and the first re-transmission. However, the one or more common information bits may generally be mapped to more reliable bit-locations in the second half of the second codeword, than in the first codeword, and as a result, the receiver may derive more reliable decoded bit-values from the retransmission. In some embodiments, the receiver may perform a parity check by comparing the decoded bit values for the common information bits in the retransmission with the decoded bit values for the common information bits in the original transmission. If the decoded bit values are different, then the receiver may substitute the decoded bit values for the common information bits obtained from the retransmission with those from the original transmission, and then re-perform parity check functions based on parity bits from the original transmission. These and other aspects are discussed in greater detail below.

Figure 1:
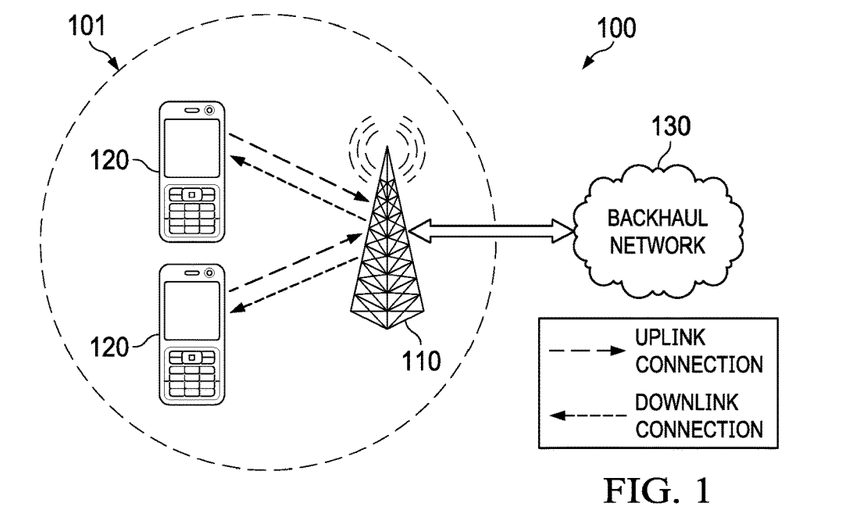
FIG. 1 illustrates a diagram of an embodiment wireless communications network.

FIG. 1 illustrates a network 100 for communicating data. The network 100 comprises a base station no having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
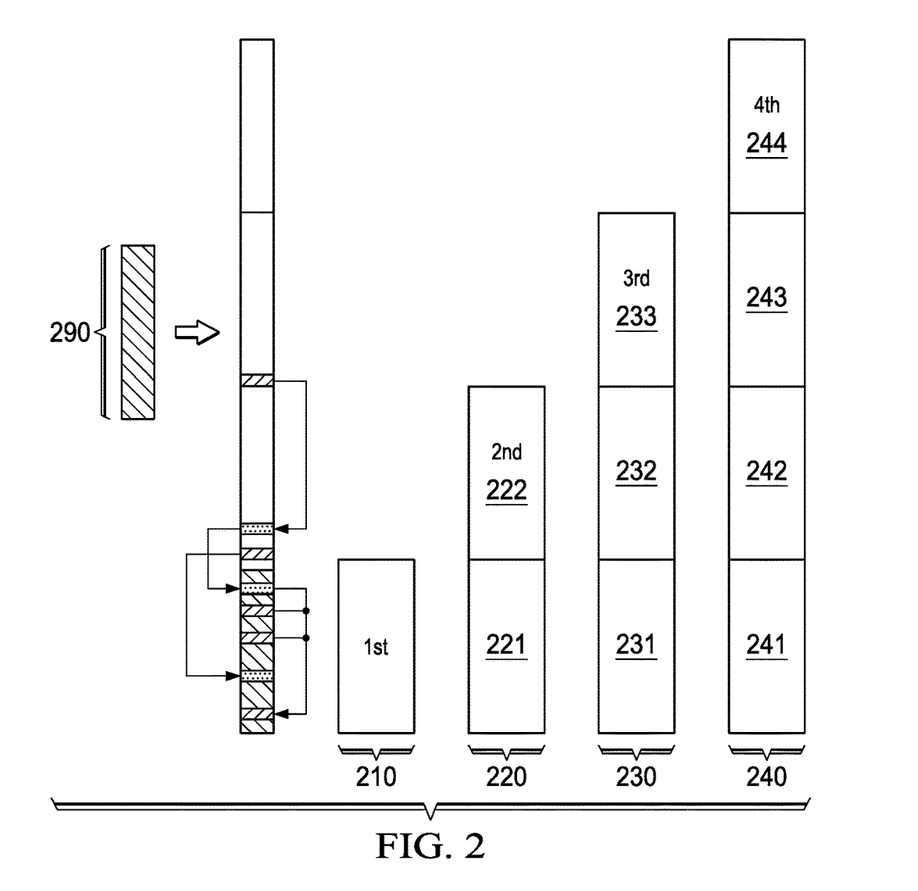
FIG. 2 illustrates a diagram of an incremental redundancy HARQ re-transmission scheme.

Aspects of this disclosure provide techniques for implementing polar encoding with incremental redundancy HARQ re-transmission. FIG. 2 illustrates a diagram of a scheme for implementing polar encoding in incremental redundancy HARQ re-transmission. In this example, a message is encoded using four different polar codes to obtain four codewords 210, 220, 230, 240. The codeword 220 is twice as long as the codeword 210, the codeword 230 is three times as long as the codeword 210, and the codeword 240 is four times as long as the codeword 210. As explained in greater detail below, the codeword 210 is transmitted in an original transmission, the second half 222 of the codeword 220 is transmitted as a first retransmission if the message cannot be decoded based on the original transmission, the last third 233 of the codeword 230 is transmitted as a second re-transmission if the message cannot be decoded following the first retransmission, and the last fourth 244 of the codeword 240 is transmitted as a third re-transmission if the message cannot be decoded following the third retransmission.

Although each of the codewords 210, 220, 230, 240 carry the same set of information bits 290, the distribution of the information bits between the various portions of the respective codewords differs based on the number, and distribution, of frozen bits and parity bits in the codewords 210, 220, 230, 240. In general, the codeword 210 at least partially overlaps with the first half 221 of the codeword 221, the first third 231 of the codeword 230, and the first fourth 241 of the codeword 240 such that some of the information bits in the codeword 210 are included in the leading portions of the codewords 220, 230, 240. The degree of overlap (e.g., the number of common information bits) may vary depending on the design and/or code rate of the polar codes used to generate the codewords 210, 220, 230, 240. For example, the codeword 210 overlaps significantly with the first half 221 of the codeword 221 such that many of the information bits in the codeword 210 are present in the first half 221 of the codeword 202, while only a few information bits in the codeword 210 are present in the second half 222 of the codeword 202.

Information bits in the first half 221 of the codeword 220 are generally excluded from the second half 222 of the codeword 220, and vice versa. Likewise, information bits in each third of the codeword 230 are generally excluded from the other two-thirds of the codeword 230, and information bits in each fourth of the codeword 240 are generally excluded from the other three-fourths of the codeword 240. Different subsets of information bits may be included in the second half 222 of the codeword 220, the last third of the codeword 230, and the last fourth 244 of the codeword 240 such that different subsets of bits are transmitted during each re-transmission.

As mentioned above, the codeword 210 is transmitted in the original transmission. If the message cannot be decoded based on the codeword 210, then the second half 222 of the codeword 220 is transmitted as a first re-transmission. The first half 221 of the codeword 220 is not transmitted during the first re-transmission. Upon receiving the first re-transmission, the receiver may attempt to decode the message based on the second half 222 of the codeword 220 and the codeword 210. In some embodiments, the receiver may decode in combination (e.g. using soft combining) the second half 222 of the codeword 220 and codeword 210 received in the original transmission as one codeword to obtain all of the information bits carried by the codeword 220 and codeword 210. In that scenario, the information bit values obtained from the codeword 210 are combined with corresponding information bit values obtained from the second half 222 of the codeword 220, with or without a parity check operation. For implementations with a parity check operation, the receiver may perform a parity check on the information bit values obtained from the second half 222 of the codeword 220 using parity check bit values obtained from the codeword 210. Other possibilities exist for the parity check operation.

If the message cannot be decoded based on the codeword 210 and the second half 222 of the codeword 220, then the last third 233 of the codeword 230 is transmitted as a second re-transmission. The first third 231 and the second third 232 of the codeword 230 are not transmitted during the second re-transmission. Upon receiving the first re-transmission, the receiver may decode the last third 233 of the codeword 230, the second half 222 of the codeword 220 and the codeword 210. The portions 233, 222, and 210 may be combined and decoded together. The receiver may also perform a parity check on the information bit values obtained from the last third 233 of the codeword 230 using the parity check bit values obtained from the codeword 210 and/or the second half 222 of the codeword 220.

If the message cannot be decoded following the second retransmission, then the last fourth 244 of the codeword 240 may be transmitted as a third re-transmission. The first fourth 241, the second fourth 242, and the third fourth 244 of the codeword 240 are not transmitted during the third re-transmission. The receiver may decode the fourth re-transmission, and perform a parity check similar to that described above.

Figure 3:
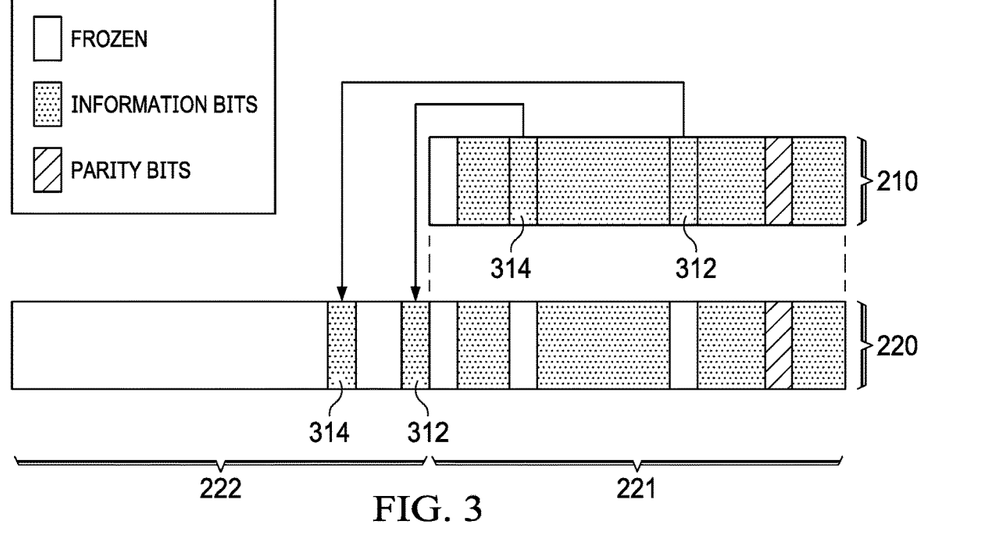
FIG. 3 illustrates a diagram of a codewords from the incremental redundancy HARQ re-transmission scheme depicted in FIG. 2.

FIG. 3 illustrates a diagram of the codewords 210 and 220. As shown, the codewords 210, 220 includes information bits, parity bits, and frozen bits. The first half 221 of the codeword 220 includes all of the information bits in the codeword 210 except for the subset of information bits 312, 314, which are included in the second half 222 of the codeword 220. In some embodiments, the subset of information bits 312, 314 may be mapped to more reliable bit locations in the second half 222 of the codeword 220 than in the codeword 210. For example, the information bits 312, 314 may be mapped to relatively low-reliability bit locations in the codeword 210, and relatively high-reliability bit locations in the second half 222 of the codeword 220. In such an example, the decoded values for the information bits 312, 314 obtained from decoding the second half 222 of the codeword 220 may be leveraged by the receiver to improve the error correction functionality. A more thorough explanation of this concept is provided below in the descriptions relating to FIG. 5.

Figure 4:
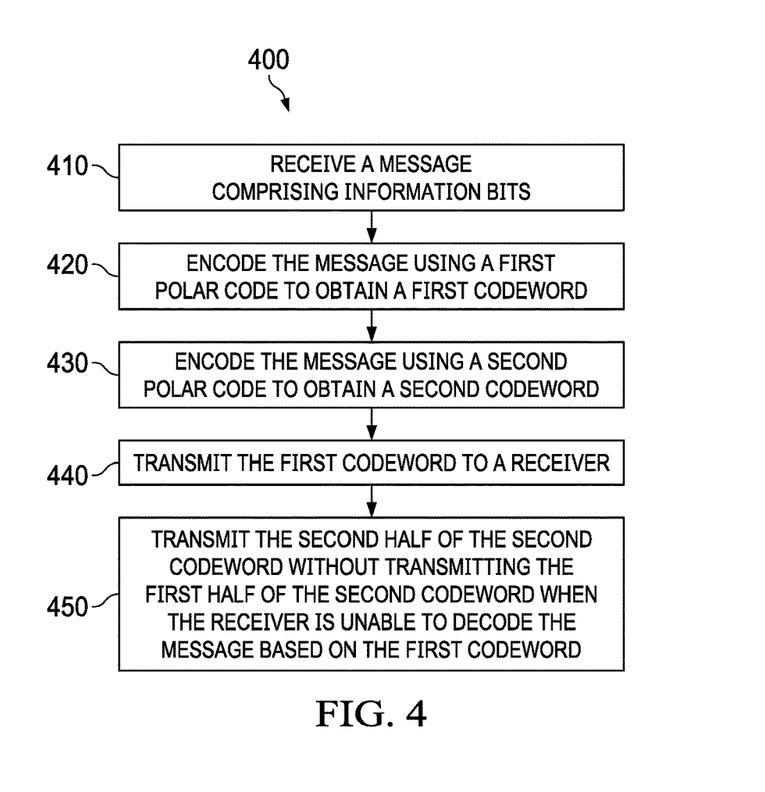
FIG. 4 illustrates a flowchart of an embodiment polar encoding method.

FIG. 4 illustrates a flowchart 400 of a polar encoding method 400 for incremental redundancy HARQ re-transmission, as may be performed by a transmitter apparatus, unit or device such as processing system woo (further details below). At step 410, the transmitter apparatus receives or otherwise obtains (e.g. with an encoder or other component of the apparatus) a message comprising information bits. At step 420, the transmitter apparatus encodes (e.g. with an encoder) the message using a first polar code to obtain a first codeword. At step 430, the transmitter apparatus encodes (e.g. with the encoder) the message using a second polar code to obtain a second codeword. At step 440, the transmitter apparatus transmits (e.g. with a transmitter) the first codeword to a receiver apparatus, unit or device such as processing system woo (further details below). At step 450, the transmitter apparatus transmits (e.g. with the transmitter) the second half of the second codeword without transmitting the first half of the second codeword when the receiver apparatus is unable to decode the message based on the first codeword.

Figure 5:
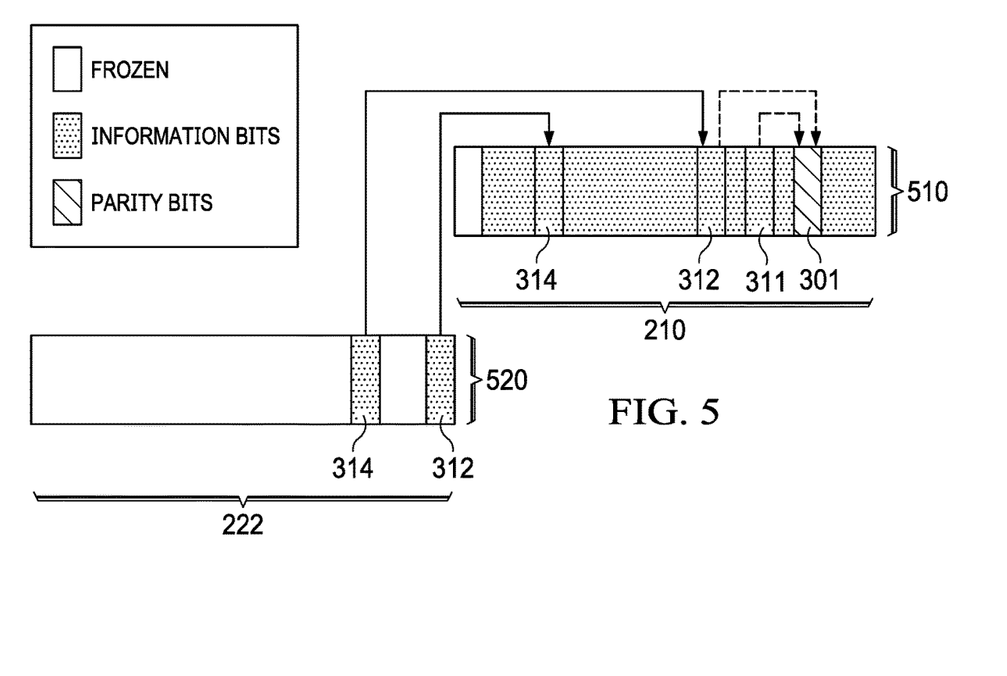
FIG. 5 illustrates a diagram of an original transmission and a re-transmission according to the incremental redundancy HARQ re-transmission scheme depicted in FIG. 2.

FIG. 5 illustrates a diagram of an original transmission 510 and a first re-transmission 520 received by a receiver apparatus. The original transmission carries the codeword 210 and the first re-transmission carries the second half 222 of the codeword 220. After receiving the original transmission 510 (e.g. via a receiver), the receiver apparatus decodes the parity and information bits in the original transmission 510, and then performs a parity check on the decoded information bit values, for example using a decoder. In this example, the receiver apparatus performs a parity check on decoded values for the information bits 311, 312 according to a decoded bit value for the parity bit 301, and determines that one of the decoded bit values is incorrect.

The receiver apparatus then receives (e.g. with a receiver) the second half 222 of the codeword 220 as the retransmission 520. The retransmission 520 may be triggered by the receiver through the communication of a negative acknowledgement (NACK) message, or through the failure to communicate an acknowledgement (ACK) message, following the receiver's unsuccessful attempt to decode the original transmissions 510. Alternatively, the retransmission 520 may be automatically performed by the transmitter irrespective of whether the original transmissions 510 was successfully decoded.

Upon reception, the receiver apparatus attempts to decode at least the information bits 314 312 in the second half 222 of the codeword 220, for example, using a decoder, and performs a parity check by comparing the decoded information bit-values for the information bits 312, 314 obtained from the first re-transmission 520 with the decoded information bit-values for the information bits 312, 314 received during the original transmission 510. Additionally, a parity check may also be performed by the decoder on decoded information bit values obtained from the first re-transmission and/or the original transmission based on parity bits in the original transmission. In this example, the receiver apparatus performs a parity check on the decoded bit value for the information bit 312 obtained from the first re-transmission 520 and the decoded bit value for the information bit 311 obtained from the original transmission 510 using a decoded bit value for the parity bit 301 obtained from the original transmission 510. Other examples are also possible.

Figure 6:
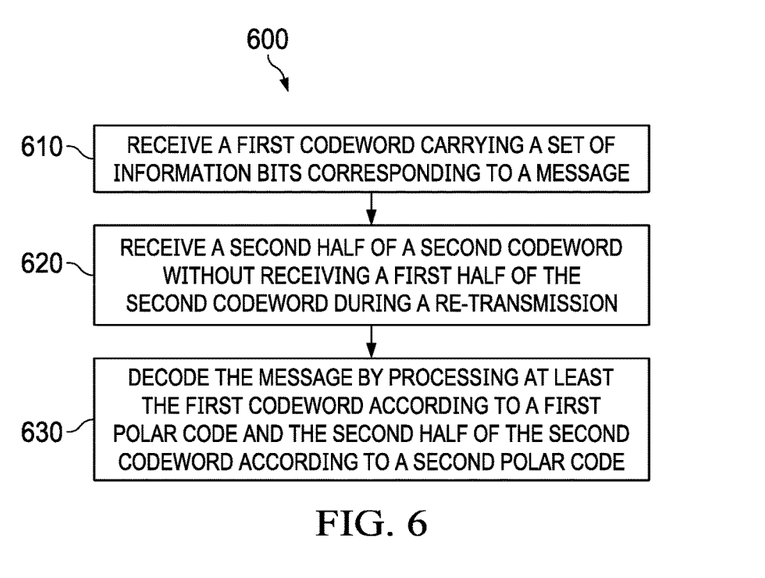
FIG. 6 illustrates a flowchart of an embodiment polar decoding method.

FIG. 6 illustrates a flowchart 600 of a polar decoding method 600 for incremental redundancy HARQ re-transmission, as may be performed by a receiver apparatus, unit or module or device such as processing system woo (further details below). At step 610, the receiver apparatus receives (e.g. with a receiver) a first codeword carrying a set of information bits corresponding to a message. The first codeword is received as part of an original transmission. At step 620, the receiver apparatus receives (e.g. with a receiver) a second half of a second codeword without receiving a first half of the second codeword. The second half of the second codeword is received as part of a re-transmission. At step 610, the receiver apparatus decodes the message (e.g. with a decoder) by processing at least the first codeword according to a first polar code and the second half of the second codeword according to a second polar code.

Figure 7:
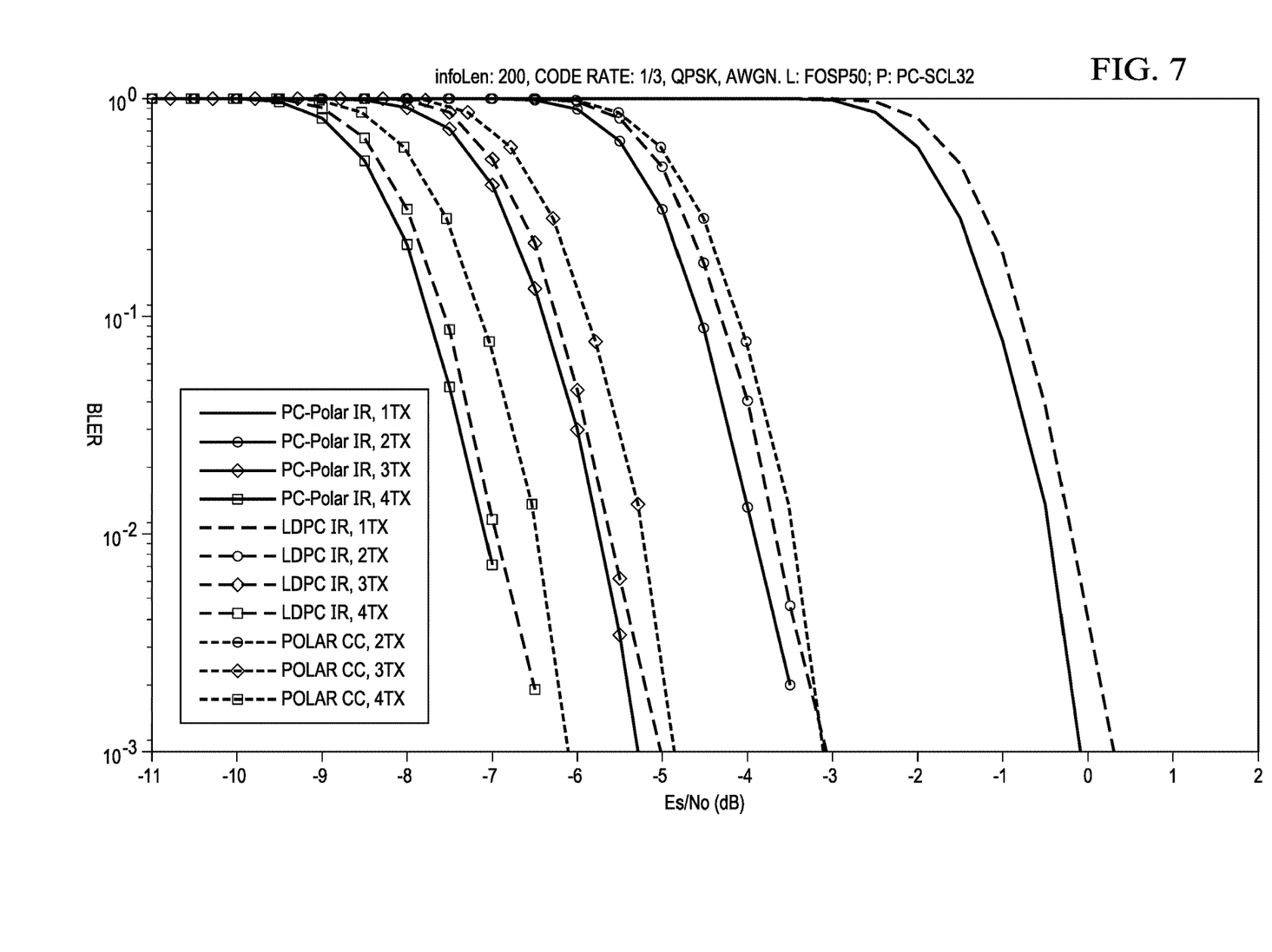
FIG. 7 illustrates a graph comparing the performance of embodiment polar encoding incremental redundancy HARQ re-transmission schemes and LDPC re-transmission schemes.
Figure 8:
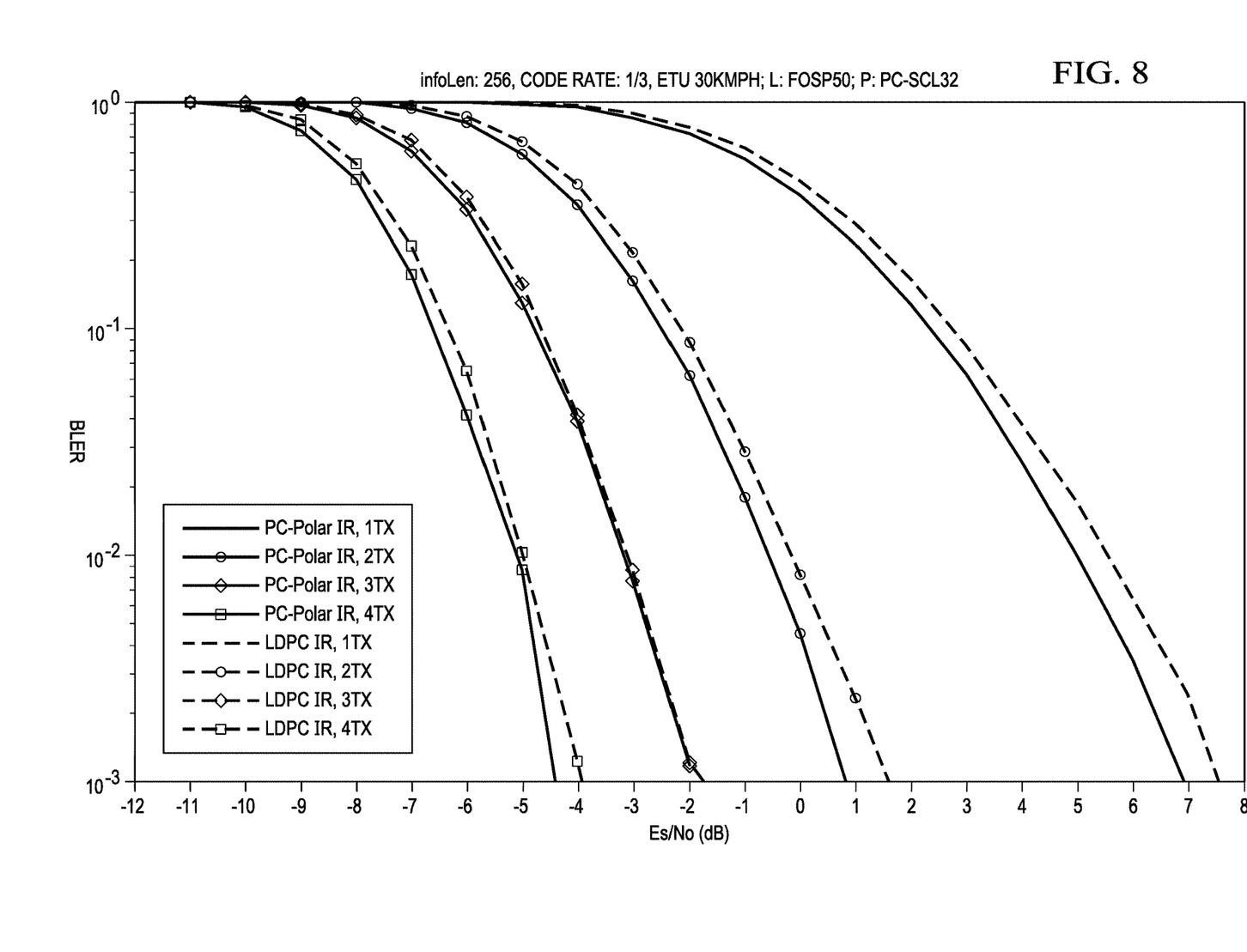
FIG. 8 illustrates another graph comparing the performance of embodiment polar encoding incremental redundancy HARQ re-transmission schemes and LDPC re-transmission schemes.

FIGS. 7 and 8 illustrates graphs of block error rate (BLER) performance of different LDPC coding techniques over a range of Es/No values (Es/No corresponds to a ratio of transmitted signal energy per symbol to noise spectrum density).

Figure 9A:
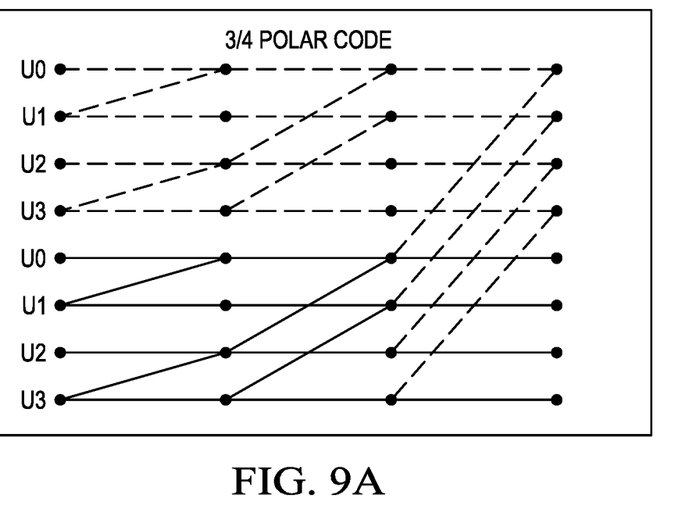
FIG. 9A is a diagram of an original transmission of a message.
Figure 9B:
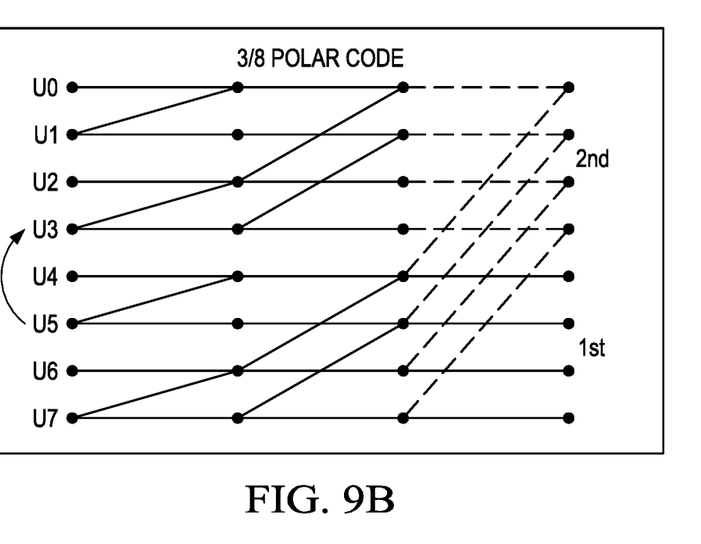
FIG. 9B is a diagram of a retransmission of the original transmission of the message depicted in FIG. 9A.

FIG. 9A is a diagram of an original transmission of a message, and FIG. 9B is a diagram of a re-transmission of the original transmission of the message depicted in FIG. 9A. In this example, the message includes three information bits. The three information bits are encoded into four-bit codeword by multiplying the information bits with a 4×4 Kronecker matrix, and the resulting four bit codeword is sent as the original transmission. In the original transmission, the information bits are mapped to bit locations [1,2,3]. For the retransmission, the three information bits are encoded into eight-bit codeword by multiplying the information bits with an 8×8 Kronecker matrix. In the retransmission, the information bits are mapped to bit locations [5,6,7]. While, in terms of the long code, the new selected information-bit set is I_2=[3,6,7], where 3 belongs to the first half or extended part of the long code. This means that sub-channel 5 in I_1 is not optimal for the long code but 3 is. So, the information bit in 5 to 3 for the long code. Note that this procedure does not change the value of the original part [4,5,6,7]. The combined original and extended pails are encoded into 8-bit codeword (multiplied by a 8×8 Kronecker matrix), and only the first half of the encoded bits will be transmitted in the 2nd transmission (see the 2nd figure). The second half of the encoded bits of the long code are same as the encoded bits in the 1st transmission. This is why we can combine the received LLR of the two transmissions and decode it as a whole codeword. (At the decoder side, u3 will be decoded prior to u5 and u5 will be treated as a parity-check bit.).

When parity check polar codes are used, the retransmission procedures are similar except that parity check functions are introduced into the precoding procedure. Following details are related to embodiments which use parity check polar codes. Incremental coded bits generation procedure: Information-bit set $I_t$, frozen-bit set $F_t$, and parity-check (PC)-Frozen-bit $PF_t$, and all sub-channel set $S_t$ in tth transmission. In (t+1)th transmission: If the mother code length is doubled after extending (e.g., from N to 2N), update the indices of $I_t$, $F_t$, $PF_t$, and $S_t$ (add N to all indices).

Step 1. Determine Information-bit set $I'_{t+1}$, PC-Frozen-bit $PF'_{t+1}$, and Frozen-bit set $F'_{t+1}$ in terms of extended code length and extended sub-channel index set $S_{t+1}$;

E.g., for $1^{st}$ transmission, $S_t=\{1,2,\ldots,N\}$. For $2^{nd}$ transmission, after code extension, $S_{t+1}=\{1,2,\ldots,2N\}$, and $S_t$ will be updated as $S_t=\{N+1, N+2, \ldots, 2N\}$.

Step 2. Determine the Information-bit set from $I'_{t+1}$ that belongs to the extended part, i.e., in $S_{t+1}$ but not in $S_t$, and mark them as new information-bit set $I_{new}$ of size K'; Determine the PC-Frozen-bit set $PF'_{t+1}$ that belongs to the extended part, i.e., in $S_{t+1}$ but not in $S_t$, and mark them as new PC-Frozen-bit set $PF_{new}$; Determine K' most unreliable sub-channels from $I_t$ that does not belong to $I_{new}$, and mark them as single PC-Frozen-bit set $PF_S$;

Step 3. Sequentially copy the bits from $PF_S$ to $I_{new}$, i.e., make one-to-one mapping or single parity-check between $I_{new}$ and $PF_S$;

Step 4. Make parity-check functions for $PF_{new}$ and $I_{new}$ in the way of PC-Polar construction;

Step 5. Precode and Arikan encode in terms of the extended PC-Polar code, transmit the incremental coded bits (the coded bits corresponding to the original part do not change due to the Arikan kernel.).

Now, for the (t+1)th transmission, the Information-bit set becomes $I_{t+1}=I_{new}$ Å$I_t$ excluding $PF_S$; the PC-Frozen-bit becomes $PF_{t+1}=PF_t \cup PF_{new} \cup PF_S$, the PC-function includes the ones made according to corresponding to $PF_t \cup PF_{new}$ and the single parity-check functions corresponding to $PF_S$.

Figure 10:
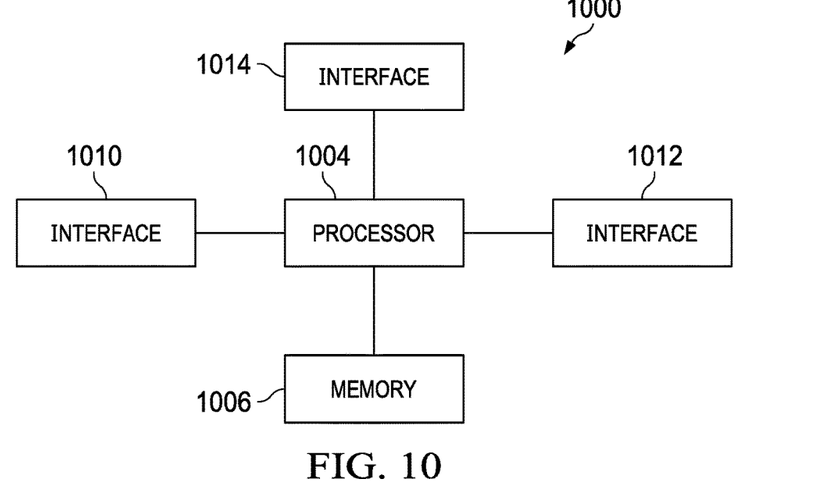
FIG. 10 illustrates a diagram of an embodiment processing system.

FIG. 10 illustrates a block diagram of an embodiment processing system woo for performing methods described herein, which may be installed in a host device. As noted above, the processing system moo is an example of how the transmitter or receiver apparatus described above may be implemented. As shown, the processing system woo includes a processor 1004, a memory 1006, and one or more interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system woo to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may each include a transceiver (transmitter and/or receiver) or be configured to connect the processing system woo to an external transceiver (transmitter and/or receiver) adapted to transmit and/or receive signaling over the telecommunications network or more generally, for communications with another device (e.g. a user device (e.g., personal computer (PC), or a network device). The processing system woo may include additional components not depicted in FIG. 10, such as long term storage (e.g., non-volatile memory, etc.).

In some embodiments, the processing system woo is included in a network device that is accessing, or part otherwise of, a telecommunications network. In one example, the processing system moo may be implemented in a network device configured to operate in a wireless or wireline telecommunications network, such as a base station, a relay station, a scheduler, a controller, a gateway, a router, an applications server, or any other device in the telecommunications network. In other embodiments, the processing system moo may be implemented in a user device configured to operate in a wireless or wireline telecommunications network, such as a mobile station, a user equipment (UE), a wireless device, a personal computer (PC), a tablet, a wearable communications device (e.g., a smartwatch, etc.), or any other device adapted to operate in a telecommunications network.

Specific devices may utilize all of the components shown, or only a subset of the components, and levels of integration may vary from device to device. Furthermore, a device may contain multiple instances of a component, such as multiple processors 1004, memories 1006, interfaces 1010, 1012, 1014 (including transmitters or receivers), and additional or alternative components not depicted in FIG. 10. Although not shown, the processing system woo may additionally include one or more input/output devices, such as a speaker, microphone, mouse, touchscreen, keypad, keyboard, printer, display and the like.

In some embodiments, the processor 1004 which may be a Central Processing Unit (CPU) may be a component of a general-purpose computer hardware platform or a component of a special-purpose hardware platform. For example, the processor 1004 may be an embedded processor, and the instructions may be provided as firmware. Some embodiments may be implemented by using hardware only. In some embodiments, the instructions for execution by the processor 1004 may be embodied in the form of a software product. The software product may be stored in a non-volatile or non-transitory memory or storage medium, which could be, for example, a compact disc read-only memory (CD-ROM), universal serial bus (USB) flash disk, or a removable hard disk.

In some embodiments, the memory 1006 is a non-transitory computer readable medium that includes instructions for execution by the processor 1005 to implement and/or control operation of the processor 1004 and other component(s) of the processing system woo (e.g. interfaces 1010-1014) and/or to otherwise control the execution of functionality and/or embodiments described herein. In an embodiment, the memory 1006 may include ROM for use at boot-up, and DRAM for program and data storage for use while executing programs.

In some embodiments, the processing system woo includes or implements an encoder (and/or a decoder) configured to encode (decode) data as described herein. The encoder (decoder) may be implemented in hardware or circuitry (e.g. in one or more chipsets, processors, microprocessors, application-specific integrated circuits (ASIC), field-programmable gate arrays (FPGAs), dedicated logic circuitry, or combinations thereof) so as to encode (decode) data as described herein for transmission (after reception) by a separate (RF) unit. In a processor-based implementation of the encoder (decoder), processor-executable instructions to perform encoding (decoding) operations are stored in the memory 1006 which may be implemented as a non-transitory processor-readable medium. The non-transitory medium could include one or more solid-state memory devices and/or memory devices with movable and possibly removable storage media.

Figure 11:
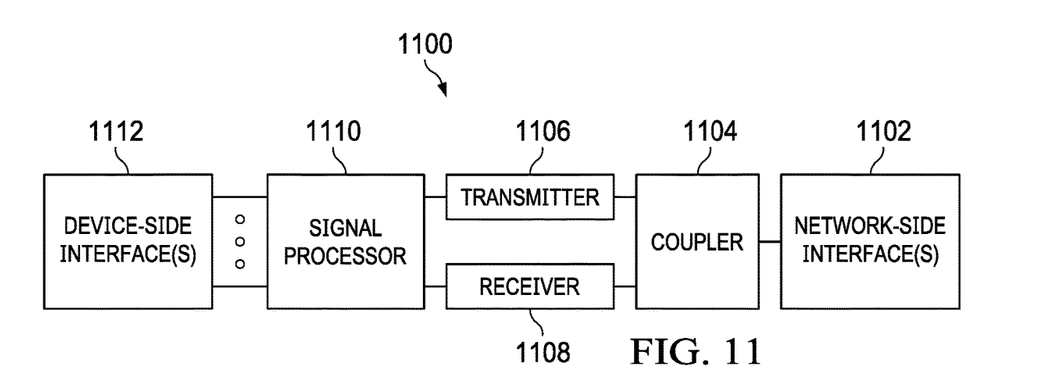
FIG. 11 illustrates a diagram of an embodiment transceiver.

FIG. 11 illustrates a block diagram of a transceiver 1100 adapted to transmit and receive signaling over a telecommunications network or more generally, for communications with another device (e.g. a user or network device). The transceiver 1100 may be installed in a host device (e.g. a network or user device) either as a separate or stand-alone RF unit or as part of an interface (e.g. interfaces 1010, 1012, 1014). As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling or for communications over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 1000, local area network (LAN) ports, etc.).

The transceiver 1100 may transmit and receive signals over any type of communications medium. In some embodiments, the transceiver 1100 transmits and receives signals over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for polar encoding, the method comprising:
obtaining, by an encoder, a message comprising information bits;
encoding, by the encoder, the message using a first polar code to obtain a first codeword;
encoding, by the encoder, the message using a second polar code to obtain a second codeword, the second codeword being twice the length of the first codeword;
transmitting, by a transmitter, the first codeword to a receiver; and
transmitting, by the transmitter, the second half of the second codeword to the receiver without transmitting the first half of the second codeword to the receiver when the receiver is unable to decode the first codeword, the first codeword including one or more information bits that are mapped to one or more most-reliable bit-locations in the second half of the second codeword.

2. The method of claim 1, wherein the one or more information bits of the first codeword are excluded from the first half of the second codeword.

3. The method of claim 2, wherein the second half of the second codeword excludes parity information for the one or more information bits that are common to both the first codeword and the second half of the second codeword.

4. The method of claim 2, wherein the first codeword is transmitted as an original transmission, wherein the second half of the second codeword is transmitted as a re-transmission, and wherein the one or more information bits are carried in more reliable bit-locations during the re-transmission than during the original transmission.

5. The method of claim 1, further comprising:
encoding, by the encoder, the message using a third polar code to obtain a third codeword, the third codeword being three times the length of the first codeword; and
transmitting, by the transmitter, the last third of the third codeword without transmitting the first two thirds of the third codeword when the receiver is unable to successfully obtain the message based on the first codeword and the second half of the second codeword.

6. An apparatus configured for transmitting data, the apparatus comprising:
a processor; and
a non-transitory computer readable storage medium storing programming for execution by the processor, the programming including instructions to:
obtain a message comprising information bits;
encode the message using a first polar code to obtain a first codeword;
encode the message using a second polar code to obtain a second codeword, the second codeword being twice the length of the first codeword;
transmit the first codeword to a receiver; and
transmit the second half of the second codeword to the receiver without transmitting the first half of the second codeword to the receiver when the receiver is unable to decode the first codeword, the first codeword including one or more information bits that are mapped to one or more most-reliable bit-locations in the second half of the second codeword.

7. The apparatus of claim 6, wherein the one or more information bits of the first codeword are excluded from the first half of the second codeword.

8. The apparatus of claim 7, wherein the second half of the second codeword excludes parity information for the one or more information bits that are common to both the first codeword and the second half of the second codeword.

9. The apparatus of claim 7, wherein the first codeword is transmitted as an original transmission, wherein the second half of the second codeword is transmitted as a re-transmission, and wherein the one or more information bits are carried in more reliable bit-locations during the re-transmission than during the original transmission.

10. The apparatus of claim 6, wherein the programming further includes instructions to:
encode the message using a third polar code to obtain a third codeword, the third codeword being three times the length of the first codeword; and
transmit the last third of the third codeword without transmitting the first two thirds of the third codeword when the receiver is unable to successfully obtain the message based on the first codeword and the second half of the second codeword.

11. A computer program product comprising a non-transitory computer readable storage medium storing programming, the programming including instructions to:
obtain a message comprising information bits;
encode the message using a first polar code to obtain a first codeword;
encode the message using a second polar code to obtain a second codeword, the second codeword being twice the length of the first codeword;
transmit the first codeword to a receiver; and
transmit the second half of the second codeword to the receiver without transmitting the first half of the second codeword to the receiver when the receiver is unable to decode the first codeword, the first codeword including one or more information bits that are mapped to one or more most-reliable bit-locations in the second half of the second codeword.

12. The computer program product of claim 11, wherein the one or more information bits of the first codeword are excluded from the first half of the second codeword.

13. The computer program product of claim 12, wherein the second half of the second codeword excludes parity information for the one or more information bits that are common to both the first codeword and the second half of the second codeword.

14. The computer program product of claim 12, wherein the first codeword is transmitted as an original transmission, wherein the second half of the second codeword is transmitted as a re-transmission, and wherein the one or more information bits are carried in more reliable bit-locations during the re-transmission than during the original transmission.

15. The computer program product of claim 12, wherein the programming further includes instructions to:
 encode the message using a third polar code to obtain a third codeword, the third codeword being three times the length of the first codeword; and
 transmit the last third of the third codeword without transmitting the first two thirds of the third codeword when the receiver is unable to successfully obtain the message based on the first codeword and the second half of the second codeword.

\* \* \* \* \*